Nov. 20, 1956  A. H. EFRAIMSON  2,770,905
FISHING ARROWHEAD
Filed April 8, 1955
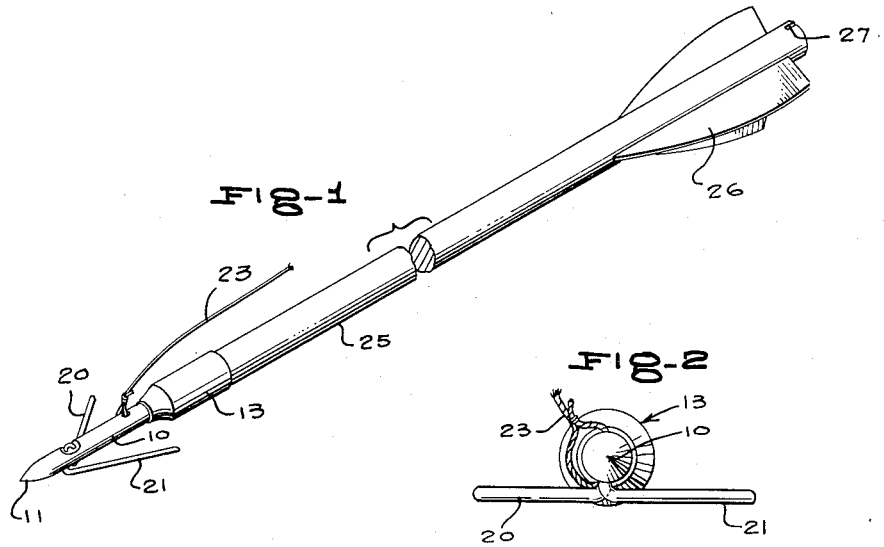
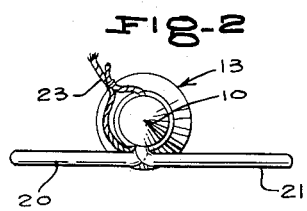
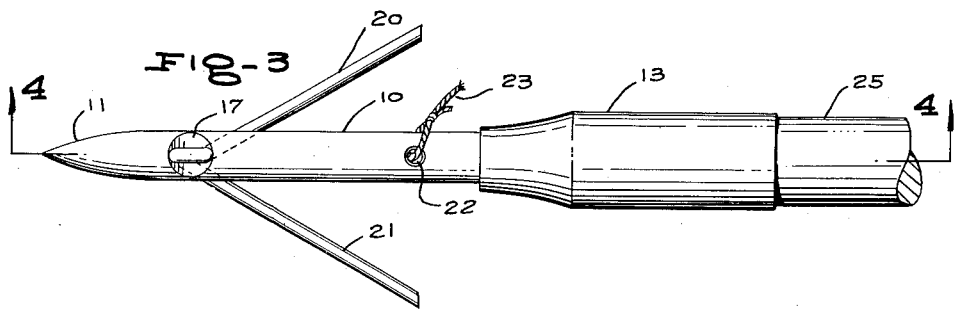
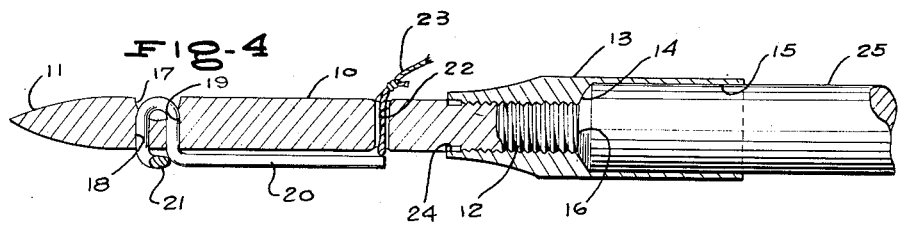
*INVENTOR.*
ARVO H. EFRAIMSON
BY
McMorrow, Berman & Davidson
ATTORNEYS

United States Patent Office 2,770,905
Patented Nov. 20, 1956

2,770,905
FISHING ARROWHEAD

Arvo H. Efraimson, Syracuse, N. Y.

Application April 8, 1955, Serial No. 500,134

2 Claims. (Cl. 43—6)

The present invention relates to an arrowhead and in particular to an arrowhead for use while shooting or spearing fish.

The primary object of the present invention is to provide an arrowhead for use while shooting or spearing fish and one which is detachable from the shaft on which it is carried after the arrowhead has pierced the fish so that the shaft may be protected from breakage when the fish tries to escape.

Another object of the present invention is to provide an arrowhead for use while shooting or spearing fish and one which has a barb structure easily and readily attached to the arrowhead, and as easily formed to any desired width and at any angle with respect to the longitudinal axis of the arrowhead.

A further object of the present invention is to provide an arrowhead which is simple in structure, one sturdy in construction, economical to manufacture and assemble, and one which is highly effective in action while catching carp and other non-game fish.

These and other objects and advantages of the present invention will be fully apparent from the following description when taken in connection with the annexed drawings, in which:

Figure 1 is an isometric view of the arrowhead of the present invention attached to an arrow shaft, Figure 2 is a front view of the assembly shown in Figure 1, Figure 3 is a top plan view of the arrowhead of the present invention with a portion of the shaft, and Figure 4 is a side view in cross-section on line 4—4 of Figure 3.

Referring in greater detail to the drawings in which like numerals indicate like parts throughout the several views, the present invention consists of a fishing arrowhead for use while fishing or spearing carp or other non-game fish and comprises a solid, cylindrical body 10 fabricated of stainless steel or other relatively heavy, strong, and non-corrosive material and having at one end a conically-shaped point 11. The other end of the body 10 is threaded, as indicated by the reference numeral 12 in Figure 4, and is received within a threaded bore extending longitudinally through a sleeve 13. The inner end of the bore in the sleeve 13 terminates in the bottom wall 14 of a socket 15 formed in the sleeve at the end of the sleeve opposite to the bore therethrough, and the end face 16 of the body 10 is machined to be contiguous with the bottom wall 14, the latter shown to be curved in Figure 4.

The body 10 is formed on one side at a point adjacent to the conically-shaped point 11 with a semicircular groove or notch 17 which extends transversely of the body, the latter also being provided with a pair of apertures arranged longitudinally of the body with respect to each other and extending transversely from the other side of the body 10 and terminating in the notch 17. The latter apertures are indicated by the reference numerals 18 and 19 in Figure 4.

A barb structure consisting of a pair of barbs 20 and 21 is formed from a single strand of semi-rigid wire bent to substantially a V-shape and extending through both of the apertures 18 and 19 so that the apex of the wire is seated in the notch 17 and the diverging legs of the wire extend longitudinally of the body 10 with the diverged ends adjacent the sleeve 13.

Another aperture 22 extends through the body 10 between the apertures 18 and 19 and the sleeve 13 so that a line 23 may be attached to the body 10, the aperture 22 having both of its ends countersunk or tapering outwardly in order that the line 23 be protected from fraying.

The body 10 is cut back with a "relief" as indicated by the reference numeral 24 adjacent to its threaded one end in order that the sleeve 13 be prevented from splitting or rupturing when it is assembled upon the body 10.

The socket 15 is adapted to receive snugly and yet loosely the one end portion of a shaft indicated by the reference numeral 25, it being an important feature of the present invention that the shaft 25 be instantly detachable from the arrowhead formed by the body 10 and the barbs 20 and 21 in order that the shaft 25 be saved from breakage when a fish is speared or shot and the barbs have caught within the flesh of the fish, generally starting the fish in a frenzy of motion to dislodge the barbs and the pointed body 10 and sending the fish into the weeds and against logs or rocks in order to rub off the offending arrowhead. The line 23 is used to retrieve the fish and arrowhead either before or after the shaft 25 has been detached from the socket 15. The barbs 20 and 21 formed from the single strand of bent wire may be bent inwardly from the diverged position shown in Figures 1, 2 and 3, to any desired angle or width for the particular type of fishing engaged in.

It is to be understood that the shaft 25 is of any conventional make and is provided with feathers 26 at its end remote from its connection to the socket 15 and with a notch 27 by means of which it may be driven by the string of a bow.

What is claimed is:

1. An arrowhead comprising a cylindrical solid body having a conically-shaped point at one end thereof and a socket at the other end adapted to receive an end portion of a shaft, said body being provided with a pair of apertures arranged in spaced longitudinal relation and extending through said body adjacent said point, a single strand of formable material extending through said apertures and bent to substantially a V-shape with its apex on one side of said body and with its legs on the other side of said body extending longitudinally thereof and in diverging relation and forming a pair of barbs, the diverging ends of said barbs extending to a point adjacent said socket, and a retrieving line attached to said body intermediate said apertures and said socket.

2. An arrowhead comprising a cylindrical solid body having a conically-shaped point at one end thereof and a socket at the other end adapted to receive an end portion of a shaft, said body being provided on one side with a semi-cylindrical notch extending transversely of said body, said body being further provided with a pair of apertures arranged in spaced longitudinal relation and extending inwardly from the other side of said body and terminating in said notch, a single strand of formable material extending through said apertures and then to substantially V-shape with its apex seated in said notch and with its legs on the other side of said body extending longitudinally thereof and in diverging relation and forming a pair of barbs, the diverging ends of said barbs extending to a point adjacent said socket, and a retrieving line attached to said body intermediate said notch and said socket.

References Cited in the file of this patent

UNITED STATES PATENTS

| | | |
|---|---|---|
| 1,072,172 | Schell | Sept. 2, 1913 |
| 2,289,284 | Chandler | July 7, 1942 |
| 2,455,784 | Lapsensohn | Dec. 7, 1948 |